United States Patent [19]
Edgar

[11] Patent Number: 6,075,590
[45] Date of Patent: Jun. 13, 2000

[54] REFLECTION INFRARED SURFACE DEFECT CORRECTION

[75] Inventor: Albert D. Edgar, Austin, Tex.

[73] Assignee: Applied Science Fiction, Inc., Austin, Tex.

[21] Appl. No.: 09/256,120

[22] Filed: Feb. 24, 1999

Related U.S. Application Data

[60] Provisional application No. 60/076,494, Mar. 2, 1998.

[51] Int. Cl.⁷ .................................................. G01N 21/00
[52] U.S. Cl. .................................... 356/237.1; 356/239.1; 250/330; 250/341.8; 382/191; 382/275; 382/318
[58] Field of Search ............................. 356/237.1, 237.2, 356/237.3, 237.4, 394, 239.1, 239.3, 239.7; 250/339.11, 330, 341.8; 382/112, 8, 254, 275, 318

[56] References Cited

U.S. PATENT DOCUMENTS 5,266,805  11/1993  Edgar ........................................ 250/330
5,570,431  10/1996  Gillard et al. ........................... 382/149

FOREIGN PATENT DOCUMENTS 1547811  6/1979  United Kingdom .
1547812  6/1979  United Kingdom .

*Primary Examiner*—Hoa Q. Pham
*Assistant Examiner*—Sang Hoang Nguyen
*Attorney, Agent, or Firm*—Locke Liddell & Sapp LLP

[57] ABSTRACT

Surface defects in a reflection scan of a print made with visible light are corrected by using a scan of the print made with infrared light. This correction of surface defects is performed by controlling the intensity of defect detail in the infrared record by multiplying that defect detail by a gain. The gain varies for each region of the image as a function of the brightness of the image in that region. The gain approaches unity for white areas of the image, drops toward zero for darker areas, and approaches a small negative number for black areas of the image. The gain-multiplied defect detail is then subtracted from the visible image to create the corrected image free of the surface defects.

20 Claims, 9 Drawing Sheets

REFLECTION INFRARED SURFACE DEFECT CORRECTION

RELATED APPLICATION

This application relies on U.S. Provisional Application Serial No. 60/076,494 filed Mar. 2, 1998, and entitled "Reflection Infrared Surface Defect Correction."

TECHNICAL FIELD OF INVENTION

This invention relates to electronic scanning of images, and more particularly to the scanning of photographic prints by reflected light and the removal of surface defects.

BACKGROUND OF THE INVENTION

FIG. 1 portrays a common art apparatus to provide reflection scanning. In this figure, a reflection original, such as a paper document or reflection photographic print 102, is illuminated by a light source 104. A light path 106 from the light source 104 reflects from the print 102 as ray 108, and is focused by lens 110 onto a sensor 112. The sensor 112 typically may be a linear silicon sensor array such that, when focused by lens 110, it senses at any single time a line of points defining the scanning line 114 on the print 102. As time progresses, the print 102 is moved in direction 116 so that all points on the print 102 sequentially pass under the scanning line 114 and are sensed by the sensor 112.

The sensor 112 is attached by cable 120 to a computer 122. Associated with the sensor 112 are support electronics 124 that convert the analog signal from the sensor 112 into scan data which are digital numbers fed to the computer 122. Inside the computer 122 the scan data representing the image 130 is stored as a memory array consisting of an array of individual numbers 132 called pixels.

Typically, the sensor array 112 contains three lines, each line behind a filter of a different color, to scan three images simultaneously and produce multiple channels 133, 134, and 136 of the image, each representing a different primary color.

Also apparent in the scanned image 130 are defects such as dust, fingerprints, and scratches 138. These defects produce minor functional degradation in scanned images of documents; however, as reflection scanners are used more and more for scanning photographic images, these defects are emerging as a major limitation on the use of reflection scanners for this latter purpose. There are several reasons for these limitations. First, unlike a document which is primarily white or black and therefore requires only distinction between white and black, photographic images include all shades, and so even minor defects degrade the distinction between shades. Second, photographic images are very often much smaller than documents, typically five inches along each side, and therefore are very often magnified after being scanned. This magnification greatly increases the size and noticeability of defects. And thirdly, photographic images are often considered aesthetic works of art which are functionally degraded by small defects that would be ignored in a document scanned only for content.

Although a professional photographer might exercise more care for images and take special care when scanning them, the image literacy revolution is moving scanners into the hands of the general public and into publicly accessible kiosks, small office environments, homes, and schools. These environments are particularly prone to defective scans because the prints to be scanned are handled by people who are not professional image handlers. Accordingly, it is apparent that the automatic elimination of defects in a reflection scanned image would provide a major advance to the art and permit the image literacy revolution to move forward expeditiously.

FIG. 2 portrays a transmission scanning device 200 for inputting images from a transmissive media such as a negative film, or a positive film, sometimes generally called a transparency. A lamp 202 emits light ray 204 which transilluminates a film 206 and is received by a digital imaging device 208. The digital imaging device 208 may consist of a lens and linear sensor array as previously shown in FIG. 1, although many other configurations are commonly known in the art.

The digital imaging device 208 samples the brightness of the image at discrete points called pixels, turns each of these analog brightness measurements into digital numbers, and passes this data along cable 210 to computer 212. Inside computer 212 the image 214 is stored as a memory array 220 consisting of individual pixels 222.

The apparatus 200 may also include a filter wheel 226 containing several filters to color the light ray 204. For example, a specific filter 230 may color the light 204 red, and therefore provide a scan through camera 208 of the cyan dye in the film 206. Other filters can be used to capture images 230 and 232 in the other primary colors to give together a full color image. Other methods of distinguishing color are commonly known in the art.

Apparent in memory array 220 are dust, fingerprints, and scratches 236. In the past, these defects were a major problem for the industry. For publication images, some major magazines were able to seal the negatives in oil between glass to eliminate most of these defects, but such a solution is obviously not appropriate for the general public. Software designers have also attempted to solve the problem by selective softening, usually with extensive user intervention. As a result, most people working professionally with images have spent tedious hours manually removing these surface defects from images.

An advance in surface defect correction is taught in U.S. Pat. No. 5,266,805 issued to the present inventor. The theoretical motivation behind this prior art method is shown graphically in FIG. 3. In FIG. 3, the horizontal axis represents color arranged by wavelength, and the vertical axis represents brightness measured by transmission in a transmission scan or reflectance in a reflective scan. In this application brightness is referred to by the variable "x". The graph shows the brightness of the cyan, magenta, and yellow dyes used in photographic color images.

Under the wavelength of green light at 302, one sees the absorption of magenta dye as well as any surface defects. Under the wavelength of red light at 304, one sees the absorption of cyan dye and surface defects. Under the wavelength of infrared light at 306, an interesting thing happens; namely, all the dyes pass the infrared light and the image functionally disappears, so that under infrared light one sees a blank piece of film in addition to the surface defects. By dividing the measured red brightness by the measured infrared brightness, one can calculate what the measured red brightness would have been with no surface defects. After repeating this prior art process for all pixels in all primary colors, the surface defects can be erased from the image.

Returning to FIG. 2, an infrared selective filter 250 is added to filter wheel 226 and used in conjunction with digital imaging device 208 to provide a fourth color memory, or channel, array 252 consisting of individual pixels 254 each containing a number representative of infrared brightness at the corresponding point of the film 206. The infrared memory array 252 contains the defects 256 but no image 214 because the three dyes that create an image 214 in film 206 are all transparent to infrared light. Each pixel 222 in the visible memory array 220 is divided by the corresponding pixel 254 in the infrared memory array 252 by function 258 to yield a corrected pixel 260 in the corrected image array 262. This process is repeated for each color channel to produce the other color channels 264 and 266, automatically yielding a defect free image 268 from the film.

As will be apparent in the general description, the process of infrared surface defect correction as taught in the prior art was not extendable to reflection scans. This was unfortunate because on average significantly more reflection scans are made as compared to transmission scans. A method of extending infrared surface defect correction to reflection scanning would be a major advance to the art of digital imaging.

FIG. 4 illustrates a further related art that is background to the current invention. In the context of surface defect correction, infrared brightness can be used to determine the percent attenuation attributable to a defect. For example, if the infrared record were attenuated from 100% with no defect to 90% with a defect present, and the visible record transmitted 9% with the defect present, obviously the visible record would have transmitted 10% without the defect. A common mistake is to subtract, rather than divide, the infrared record. In the example just given, the infrared transmission dropped from 100% to 90%, a change of −10%. If −10% is subtracted from the measured 9% visible transmission, the result is a 19% transmission, a gross overcorrection.

Nevertheless, it is often desirable to perform a surface defect correction as a subtraction rather than a division. For example, it may be desirable to perform the correction separately on separate frequency bands. Obviously, one cannot divide two cycles that average to zero with any image remaining; one must instead use the linearity of a subtraction. To overcome this problem, the logarithm of each pixel is first calculated. A subtraction of two images, each in the logarithmic domain, is functionally equivalent to a division outside the logarithmic domain. In the example given above, $\log(100\%)-\log(90\%)=\log(10\%)-\log(9\%)$.

The method of FIG. 4 receives a visible image 402 containing a defect 404, and an infrared image 406 of the same film with the defect 408. For reasons explained above, the logarithm is taken of the data in each pixel in the images to produce the log visible image 410 and the log infrared image 412. Further processing is then performed on small overlapping blocks of the images, such as block 416, enlarged as block 418 to show vertical strands of hair 420 and the horizontal scratch 422. Similarly, block 428 is enlarged as block 430 to show only the horizontal scratch 432. Next the visible block 418 and the infrared block 430 undergo a transform operation to yield the transformed visible block 436 and the transformed infrared block 438. The transform is selected to better isolate the defect scratch 422 from the hair 420. Although the hair 420 and the scratch 422 overlap each other in the visible block 418, they have different characteristics that can be used to distinguish them with the properly chosen transform. Such characteristics include angle and frequency. These characteristics are distinguished by several linear transforms, including the discrete cosine transform (DCT), and the discrete Fourier transform (DFT), both well known in the art. The DFT has the best separation of diagonal angles, but the DCT handles boundary conditions better.

In either the DCT or DFT, the vertical hair 420 produces a pattern 440 in transform space that is well separated from the pattern 442 produced by the horizontal scratch 422. The advantage of operating in transform space is now apparent: there can be more complete removal of the defect pattern 442 with less damage to the image pattern 440 if they have less overlap. This may be analogized to the increased ease with which a weed may be removed the farther it is from a flower.

In practice, the isolation of the resulting image and defect transform patterns will usually be less crisp than in this simple illustration; however, a transform such as the DCT will provide much better isolation than would be seen in the raw image.

Continuing with the related art method, the transformed defect block 438 containing the defect pattern 448 is split into two blocks 450 and 452, representing together a range between which the defect pattern 442 in the visible transform 436 is expected to lie. In particular, block 450 bounds the defect from below with a lowered defect limit 454, and block 452 bounds it from above with a raised defect limit 456. The range between defect limits 454 and 456 provides some "wiggle room" to ensure erasure of the visible defect pattern 442. Therefore, the infrared defect pattern 448 does not need to perfectly match the visible defect pattern 442 to insure complete defect removal. This "wiggle room" is critical to inexpensive scanners that may not image infrared details precisely the same as visible details. If the range is too small, not all the defect will be removed. If it is too broad, some image detail will be lost along with the defect. The better the transform is at isolating image and defect, the more the range can be expanded to ensure defect erasure without damaging image detail.

Function block 460 subtracts the defect blocks 450 and 452 from the image block 440 to produce the corrected block 462 containing, ideally, only the transformed image component 464. In particular, function block 460 is a smart subtraction that, for each element in block 436, will subtract whatever blend of the same matching elements in blocks 450 and 452 will give the smallest magnitude after subtraction. As an example, suppose specific element 470 of the image transform had a value of 10.0; the upper bound element 472 was 4.0; and the lower bound element 474 was 2.0. Obviously, subtracting 10.0−4.0=6.0 produces a smaller magnitude than 10.0−2.0=8.0, and so 6.0 is written into element 476 of the corrected transform image 462. Algorithmically, a trial subtraction is made of element 470 minus element 472, and of element 470 minus element 474. If the two results are of opposite sign, then the result of the smart subtraction 460 is set to zero; otherwise, it is whichever of the two has the smaller magnitude.

Finally, the inverse transform is taken of block 462 to yield corrected image block 480. This block 480 is placed back into the corrected logarithmic image 482 at block position 484. The process is repeated with all other, possibly overlapping, blocks in the image to construct the complete corrected logarithmic image 482. To finish, the antilog is taken of each pixel in image 482 to yield the finished image 486, similar to the input visible image 402 but without the defects 404.

SUMMARY OF THE INVENTION

The present invention provides for automatic removal of defects by receiving from a reflection scan of a photograph two scans: a visible scan and an infrared scan. The infrared scan is processed by multiplying infrared pixel data by a gain that varies with the brightness of the image at each pixel such that details in the highlights are unattenuated, details in light grays are attenuated somewhat, details in dark grays are almost extinguished, and details in shadows are inverted to appear as a negative. This multiplied infrared scan is then subtracted from the visible scan to yield a corrected visible scan.

The disclosure further teaches methods of deriving the gain function, and methods of doing the subtractions within a tolerance range.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREPARED EMBODIMENT

Figure 5:
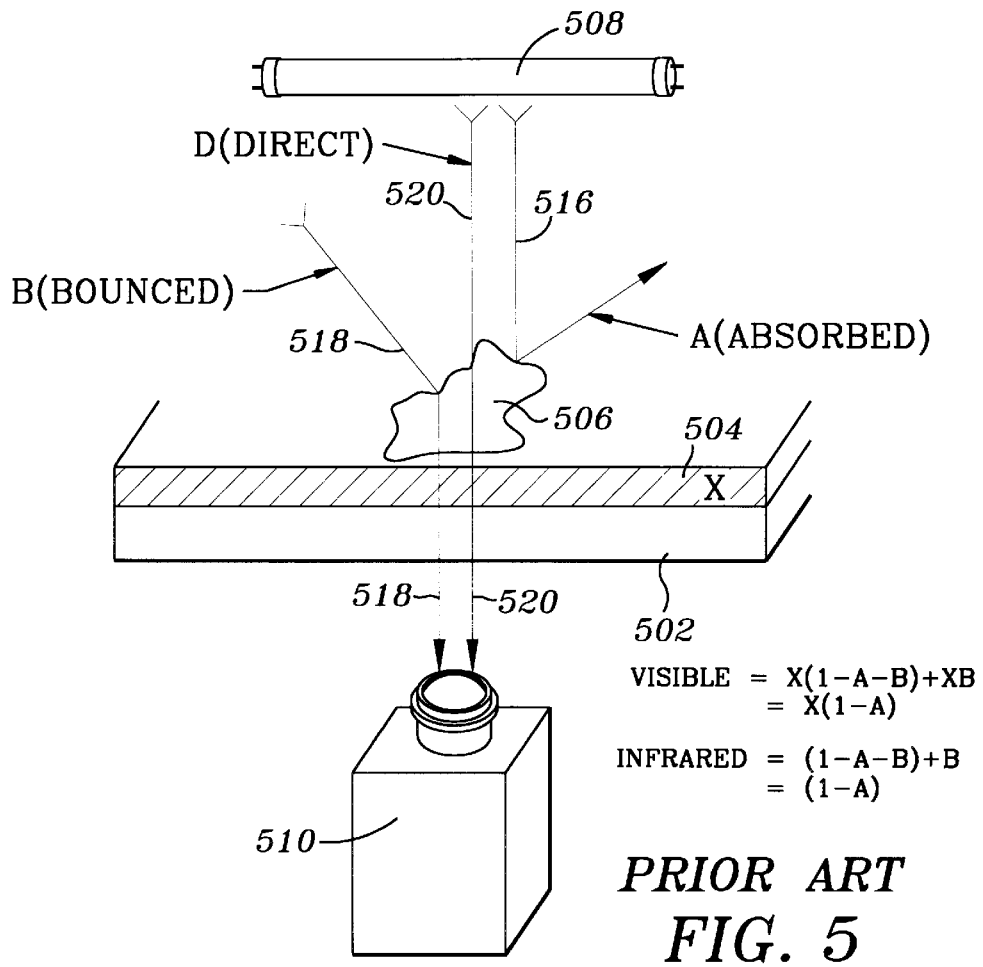
FIG. 5 defines terms describing the effect of a defect on a transmission scan.

FIG. 5 defines various terms that will be used in this discussion. The terms are first applied to traditional transmission scanning. A film substrate 502 bears an emulsion 504 with a transmissivity x that varies from 0.0 to 1.0. A defect 506 lies on the emulsion 504. A lamp 508 emits light rays 516, 518 and 520 that are intercepted and sensed by camera 510 that is selectively sensitive to visible and infrared light. Some light rays such as 516 are either absorbed, reflected, or refracted by the defect such that they are lost to the imaging process; i.e., are not detected by camera 510. This component of lost light will be called "A" for Absorbed. Some light rays such as 518 will emerge from the lamp 508 at an angle that would normally exclude them from the imaging system, but will be refracted or reflected by the defect 506 so as to enter the camera 510. This component of extra light rays will be called "B" for Bounced. Finally, there are the direct light rays 520 that pass through the defect 506 unscathed to enter the imaging process the same as if there were no defect present. This component will be called "D" for Direct. Note that for every B light ray, there is that much less direct light D. If the film is viewed back from the direction of the camera, rays are either direct 520 (D), or if not Direct are bounced 518 (B) to an area of the lamp 508 emitting light, or if neither, are refracted away from the light or absorbed (A).

If the normal light on the part of the film 502 with no defect 506 is defined to be unity, the direct light D=1−A−B. In addition to the direct light D is the bounced light B. Both the direct and bounced light must pass through the emulsion 504 to get to the camera 510 on the other side, and therefore both get attenuated, or multiplied, by the transmissivity of the emulsion 504, which in the visible spectrum is x. Therefore, the total visible light seen by the camera 510 is: visible=x(1−A−B)+xB=x(1−A). Now in the infrared spectrum the transmissivity of the emulsion is 1.0, and therefore the total infrared light seen by the camera 510 is: infrared= (1−A−B)+B=(1−A). Based on the fact that visible=x(1−A) and infrared=(1−A), it is obvious that x=visible/infrared, and it is this relationship which permits infrared surface defect correction to work for transmission scans.

If, for a transmission scan, visible light=x(1−A) and infrared light=(1−A), then a linear change in infrared light of an amount delta will result in a corresponding linear change in visible light of x times delta. Thus, for a transmission scan, the change in visible measured in linear units divided by the change in infrared measured in linear units equals the transmissivity x. Let the result of this division be called "gain" because if a change in infrared caused by a defect is multiplied by this gain, it will quantify by how much that same defect affects the visible channel. Once how much a defect has affected the visible channel has been quantified, its effect can be subtracted out.

Note in particular that by using this method of multiplying by a gain that is a function of the transmissivity x of the film, it is possible to perform surface defect correction on linear data with a subtraction. In contrast, the prior art required a division with linear data, or required a nonlinear logarithmic space to use subtraction.

Figure 6:
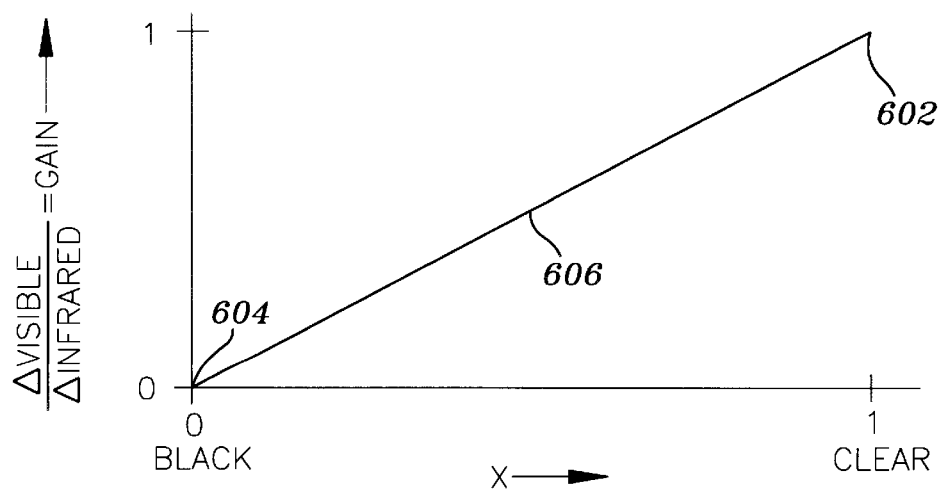
FIG. 6 is a graph that shows the relationship between visible and infrared data for a transmission scan.

FIG. 6 shows graphically how the gain described above varies with x for a transmission scan. When the film is clear, and therefore x=1, there is no difference between infrared and visible, so the change in one divided by the change in the other is unity, giving point 602. Conversely, when the film is completely black, and therefore x=0, there is no possible change in visible on a linear scale, and so the change in visible with respect to infrared is zero, giving point 604. In between points 602 and 604, the line 606 is straight.

Figure 7:
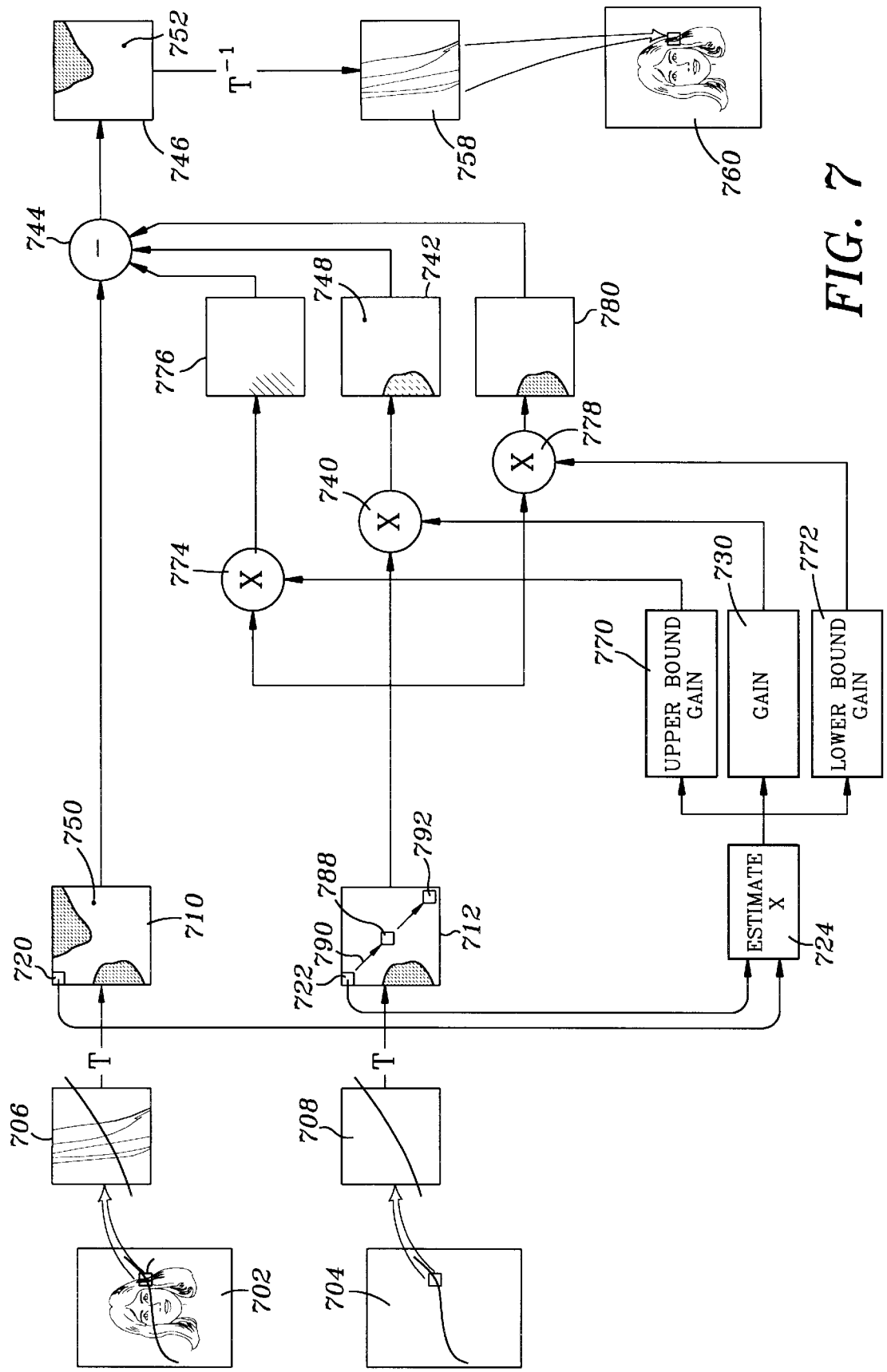
FIG. 7 illustrates a preferred method of practicing the present invention.

A surface defect correction method that uses the variable gain described above will now be disclosed with reference to FIG. 7. The method will be applied to a transmission scan, but will later be used to describe the method using a reflection scan.

To begin, a visible scan is made in linear space. By linear space it is meant that the number representing the brightness of each pixel is a linear function of watts per unit area. In other words, twice the amount of light for a given period results in a pixel value twice as big. (In the case of most scanners that incorporate gamma correction, it would be necessary to square the scanned pixel value to undo the gamma correction inherent in the scan software, and thereby receive a pure linear value.) The linear visible scan is received in FIG. 7 as image 702 along with a linear infrared scan 704. The visible and infrared scans are divided into small blocks shown enlarged as visible block 706 and infrared block 738, respectively. Both of these blocks are transformed as described previously to produce transformed visible block 710 and transformed infrared block 712.

If the transform was a DCT or DFT, one of the elements of the transform image block 706, by convention the upper left element 720, contains the average value of all pixels in the image block 706. This average for the block 706 is read for the visible and placed at pixel 720. Similarly, the average for the infrared block is placed at pixel 722. From these values, an estimate is made for the average x of the corresponding block by an estimator function 724.

Note that x=visible/infrared, as described above. Because the infrared data tends to remain close to unity for most of the image, it is acceptable to use an estimate of x=visible for the purposes of the estimator function 724 in order to avoid the singularity of a division at zero. A better acceptable estimate that still avoids the singularity of a division at zero is x=visible+((1−infrared) times visible).

The estimate applies to an image block such as 706 as a whole. Therefore, individual pixels may be misestimated if they vary widely from the average. However, this approach is acceptable because small defects are not typically noticed in areas where the image varies widely in brightness within a small block.

Now that x is estimated, it is used to calculate an appropriate gain in function block 730. For the linear case being described, this is the function given in FIG. 6 to be simply gain=x, where the gain so calculated applies to the entire block. For the moment, assume that upper bound gain 770 and lower bound gain 772 are set to zero, and so have no effect.

The gain calculated in function block 730 multiplies all elements of the infrared transform block 712 at multiplier 740 to create the attenuated infrared transform block 742. The attenuated infrared transform block 742 is then subtracted, element by element, from the image transform block 710 at the subtractor 744 to produce the corrected image transform block 746. For example, a specific element 748 is subtracted from specific element 750 to produce the specific element 752. Finally, the inverse transform is applied to the corrected image transform block 746 to produce the corrected image block 758 which is reinserted into a corrected image 760. By repeating this process with all overlapping blocks from the original image 702, the corrected image 760 is generated.

The above process subtracts at subtractor 744, rather than divides, the infrared defect record 742 from the visible record 710. In blocks where the visible record is darker, the infrared record is first dimmed by the gain to match the brightness of the visible record and avoid the overcorrection that would otherwise occur. To use the example presented earlier, if the infrared record were attenuated from 100% with no defect to 90% with a defect present, and the visible record transmitted 9% with the defect present, obviously the visible record would have transmitted 10% without the defect. The infrared transmission dropped from 100% to 90%, a change of −10%, but now this difference is multiplied by the gain proportional to x=10%, such that 10% times −10%=−1%. Now if −1% is subtracted from the measured 9% visible transmission, the result is a 10% transmission, as it should be.

Linear space is used in the above example for simplicity, not for limitation. Any space can by used by substituting the linear function of gain versus x shown in FIG. 6 with the appropriate function. Assuming that visible light=F(linear brightness), then the line of FIG. 6 is substituted with the curve described by: gain=x(dF(x)/dx). A typical gamma correction used in digital imagery derives the square root of brightness. Thus, if the image received had pixels containing the square root of brightness, the system of FIG. 7 would work by using gain=square root of x. Another interesting case arises when the image received has pixels containing the logarithm of brightness. In this case, the gain is not a function of x at all, rather the gain is a constant independent of x, as was used in the apparatus of FIG. 4.

Figure 8:
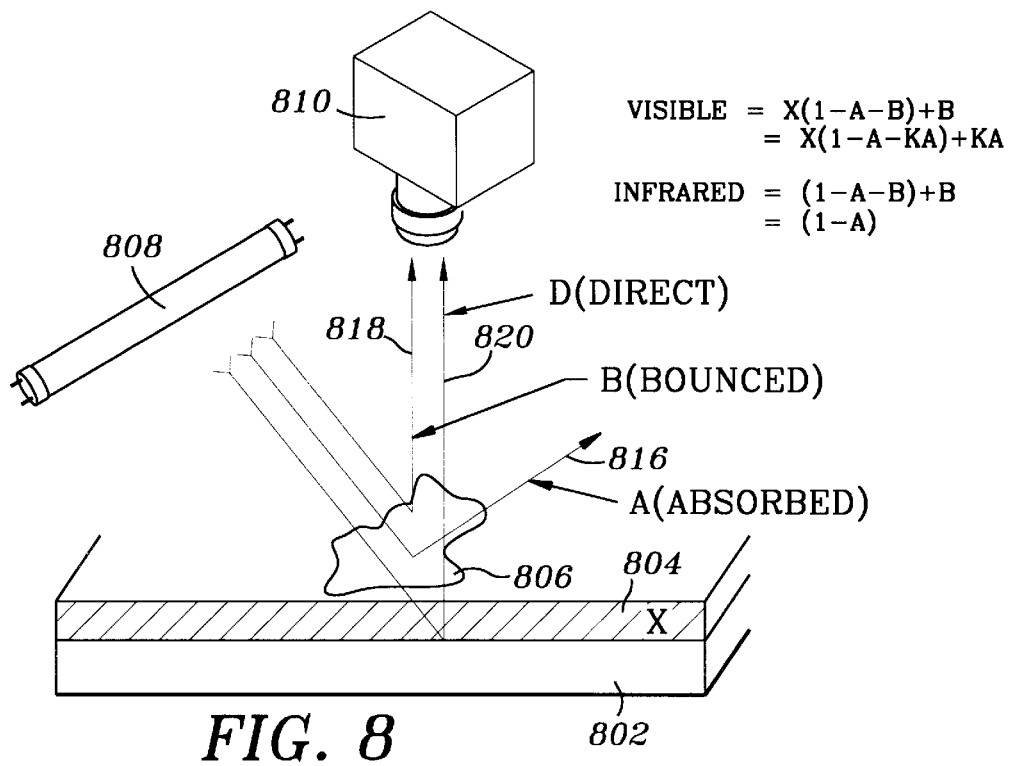
FIG. 8 defines terms describing the effect of a defect on a reflection scan.

The present invention will now be expanded to cover reflection scans. FIG. 8 uses the same nomenclature in the context of a reflection scan that FIG. 5 used for a transmission scan. A white reflective substrate 802 bears an emulsion 804 that together give a reflection x in the visible spectrum that varies from 0.0 to 1.0. A defect 806 lies on the emulsion 804. A lamp 808 emits light rays that are intercepted and sensed by camera 810 that is selectively sensitive to visible and infrared light. Some light rays 816 are either absorbed, reflected, or refracted by the defect such that they are lost to the imaging process. This component of the lost light will be called "A" for Absorbed. Some light rays 818 will be directly refracted or reflected by the defect 806 and enter the camera 810 without interacting with the emulsion 804. This component of extra light rays will be called "B" for Bounced. Finally, there are the direct light rays 820 that pass through the defect 806 unscathed, interact with the emulsion 804, and bounce back to enter the imaging process the same as if there were no defect present. This component will be called "D" for direct. Note that for every B light ray, there is that much less direct light D. If the film is viewed back from the direction of the camera, rays are either direct 820 (D), or if not direct are bounced 818 (B) to an area of the lamp 808 emitting light, or if neither, are refracted away from the light or absorbed 816 (A).

If the normal light on the film in an area with no defect is defined to be unity, the amount of direct light D=1−A−B. In addition to the direct light D, the camera 810 also sees the bounced light B. However, only the direct light must pass through the emulsion 804 to get to the camera 810 on the same side as the lamp 808, and therefore only the direct light D gets attenuated, or multiplied, by the reflectivity of the emulsion 804 and base 802, which in the visible spectrum is x. Therefore, the total visible light seen by the imaging system is: visible=x(1−A−B)+B. In the infrared spectrum, the transmissivity of the emulsion is a constant 1.0, and thus the total infrared light seen by the imaging system is: infrared=(1−A−B)+B=(1−A).

From the infrared record data, the amount 1−A, and therefore A, is known; however, B is not known, and without knowing B, x can not be simply calculated by a division as was done for a transmission scan. This is the critical difference for infrared surface defect correction between a transmission scan and a reflection scan. A critical assumption is that, although the amount of bounced light B is not known exactly, it can be estimated based on the amount of refracted and absorbed light A. In particular, it will be assumed that B=KA, where K is a factor that varies within a narrow, and correctable, range. K is dependent on the particular scanner used as will be described below.

Under the assumption that B=KA, visible=x(1−A−KA)+KA. It is now mathematically possible to solve for x given the amount of visible and infrared light. A practical problem which arises is that the solution involves a singularity around a value of x known as "dust gray", and therefore even very small deviations in K can destroy the image by resulting in very large artifacts. The solution to this problem will now be disclosed.

Figure 9:
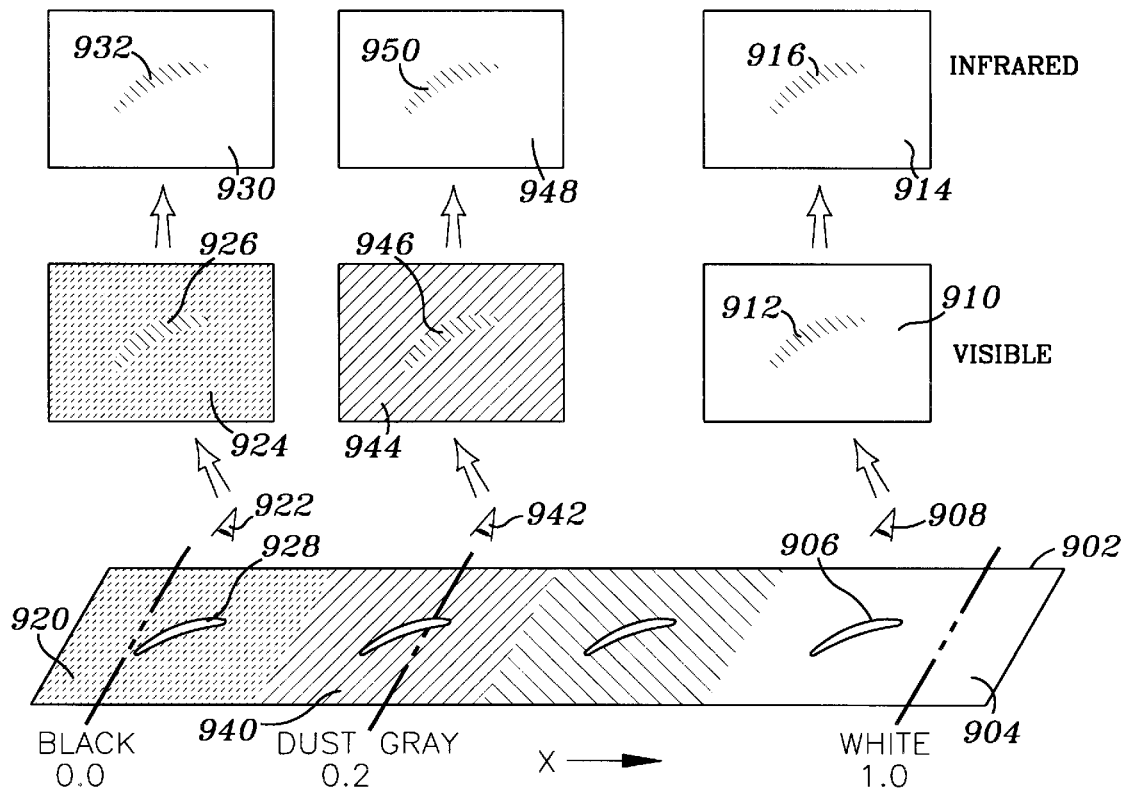
FIG. 9 visually defines dust gray.

FIG. 9 defines "dust gray", and provides an intuitive understanding of the problem. A substrate 902 bears a grayscale made with photographic dyes that transmit infrared light. Where no dyes are present such as in region 904, the substrate appears white. A piece of dust 906 lying on the white substrate is seen by an eye 908 to be a white background 910 overlaid with a gray piece of dust 912. The darkness of the dust is an indication of the lost A light rays illustrated in FIG. 8. If the eye could also see infrared light, it would see the same white background 914 overlaid with the same gray piece of dust 916. Where there is a heavy deposition of dyes at region 920, the substrate 902 appears black. A piece of dust 928 lying on the black substrate is seen by an eye 922 to be a black background 924 overlaid with a gray piece of dust 926. The lightness of the dust is actually due to the B light rays illustrated in FIG. 8. If the eye could also see infrared light, it would see a white background 930, the same as the white background 914, overlaid with the gray piece of dust 932.

The "dust gray" problem occurs in a portion of the substrate wherein there is just enough dye to match the grayness of the dust. This level of gray will be referred to as dust gray. At this level of gray 940, an eye 942 would see the gray background 944 overlaid with a gray piece of dust 946, such that the dust 946 is difficult to see against the background 944. At this gray level, the infrared spectrum still shows a white background 948 overlaid with a piece of gray dust 950.

The basic method of the invention can now be described with reference to FIG. 9. In white regions 904 of a reflective image, the infrared detail is subtracted from the visible image data, the same as in transmission surface defect correction. However, in black regions 920 of the reflective image, the infrared image of a defect is the negative of the visible, and so a portion of the infrared detail must actually be added into the visible, opposite to what is done for a transmission scan. The degree to which the infrared detail is subtracted from or added to the visible is a function of the visible reflectance of the image region being corrected.

If the method truly relied on all dust coming from gray textiles, it obviously would not work. Almost all real world dust is in fact clear because there is very little true light absorption in the very small pieces that compose dust. This may be proven by noting that dust tends to disappear under a liquid because surface refraction is reduced by matching indexes of refraction between the dust and liquid. The perceived grayness actually arises from refraction as seen in the A and B rays of FIG. 8. In practice, this means that perturbations to the surface arising from dust from many sources, scratches, fingerprints, and other contaminations, all have about the same level of "dust gray". For example, a surface scratch across a white area appears dark, but a surface scratch across a dark area appears white, therefore a scratch is perceived as "gray", even though the absence of something, namely a scratch, can have no color of its own. This is a critical discovery that allows the disclosed method of infrared reflection surface defect correction to function.

The piece of dust 946 can still be distinguished over the gray background 944 by careful observation of shadows and reflection boundaries. The cloaking is more effective at low spatial frequencies than at high spatial frequencies where surface variations on the dust cause "dust gray" to vary widely within small confines. A compensation for this spatial frequency dependence by increasing removal tolerances will be disclosed below.

Further, the degree of cloaking is dependent on the illumination source; in particular, more diffuse lighting will reduce the effects of surface variations on the dust, while more specular lighting will pick up individual points of reflection on the dust surface as a sparkle, and a light primarily from one side will cast shadows off the dimensional dust that are difficult to cancel.

Figure 10:
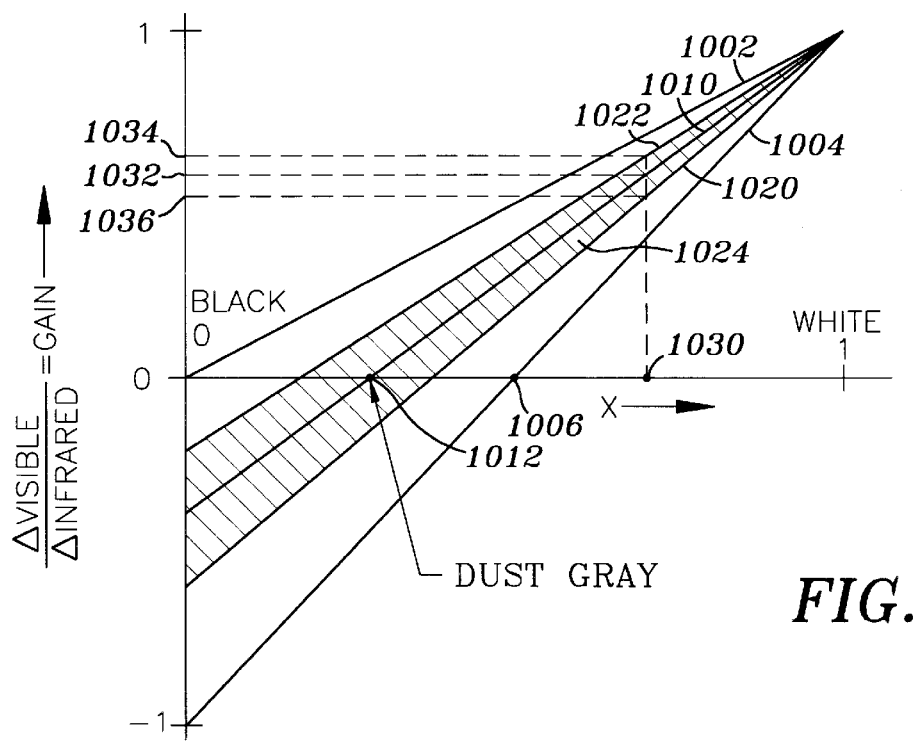
FIG. 10 is a graph that shows various relationships between visible and infrared data for a reflection scan.
Figure 3:
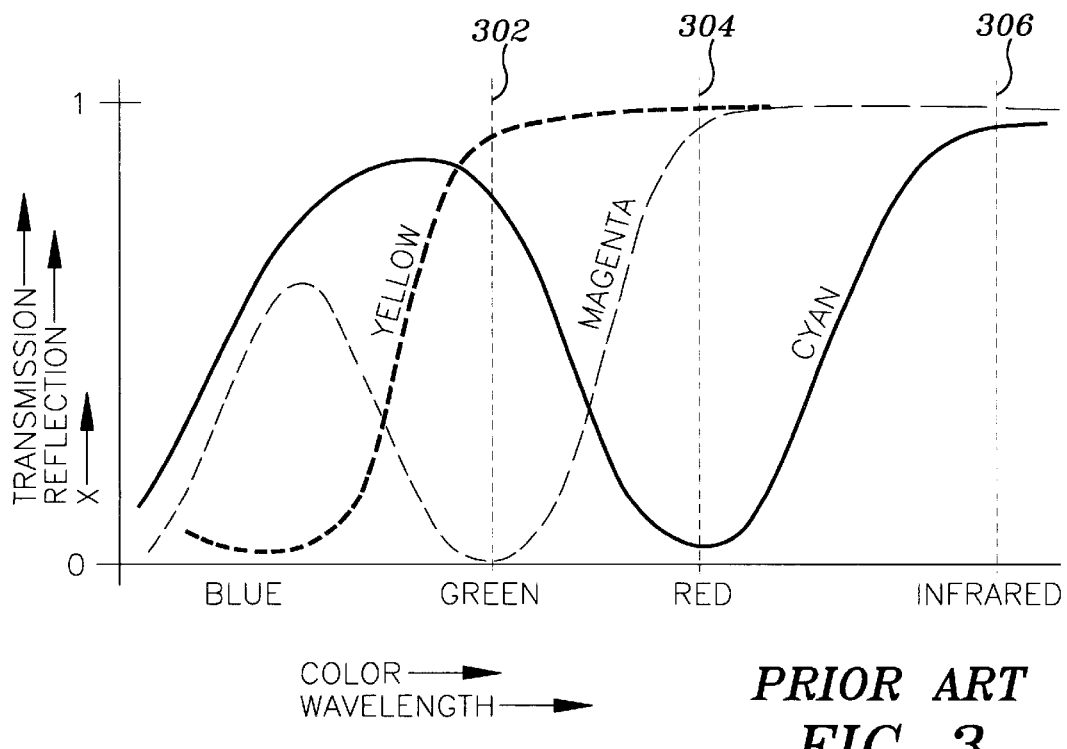
FIG. 3 is a graph of the absorption of common dyes in the visible and infrared spectra.

FIG. 10 uses the same nomenclature for a reflection scan that FIG. 6 used for a transmission scan. FIG. 10 will now be explained with reference to the formulas and conventions of FIG. 8. Let K=0. Now visible=x(1−A) and infrared=(1−A), so gain=x, exactly as in the transmission case. The gain=x line 1002 represents the case K=0. Next let K=1. Now visible=x(1−2A)+A. When x=1, gain=d((1−2A)+A)/d(1−A)=1. But when x=0, gain=d(A)/d(1−A)=−1. Between x=0 and 1, gain varies as the straight line 1004 which represents the case K=1. Note that if K=1 and x=0.5, then gain=d(0.5)/d(1−A)=0, as noted by crossover point 1006. There is in fact a family of lines for each K. Each one of this family of lines is defined by the formula: gain=−K+x(1+K).

One of these lines 1010 intersects the gain=0 axis at x=dust gray 1012. For a typical scanner, dust gray is about x=0.25, and the corresponding K=0.33. This curve represents a best estimate for the effect a change in infrared will have on visible.

As mentioned before, K is not known precisely. The lines 1020 and 1022 represent respectively the largest and smallest excursions of K across an image, and the shaded region 1024 between the curves represents the region of uncertainty, wherein if a defect is found to lie, it can be removed. As a specific example, if x=0.67 at point 1030, the best estimate is gain=0.5, point 1032, but it can be as high as gain=0.6 point 1034 or as low as gain=0.4 point 1036. Note that the region of uncertainty broadens in the shadows where the visible and infrared versions of a defect are the negative of each other, and narrows in the highlights where the visible and infrared versions of a defect match closely.

Figure 1:
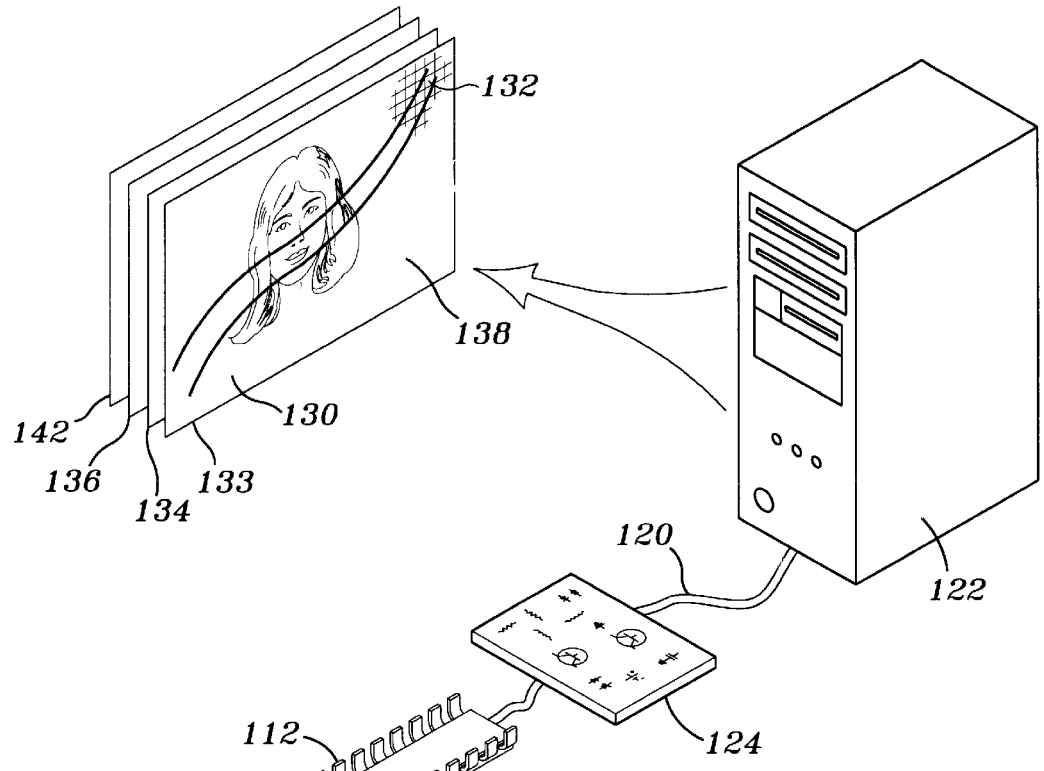
FIG. 1 portrays a prior art reflection scanning apparatus.
Figure 1:
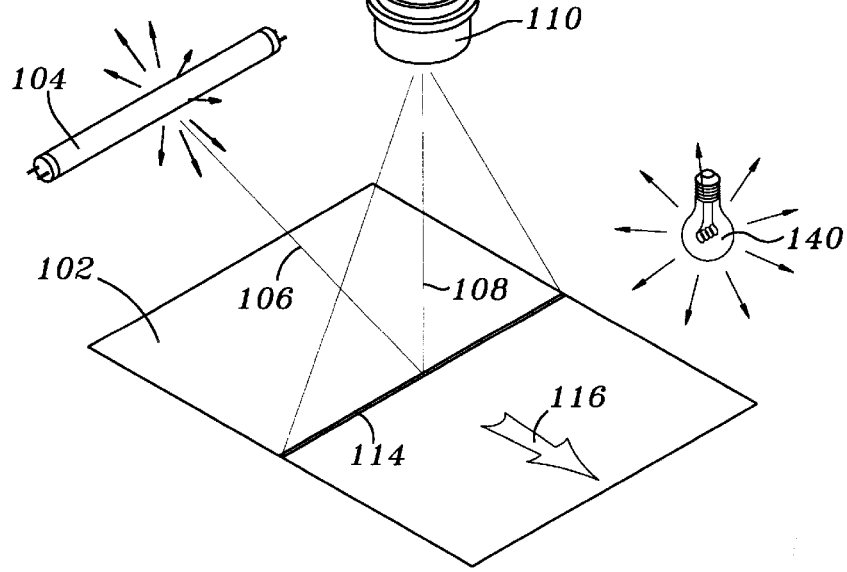
Figure 2:
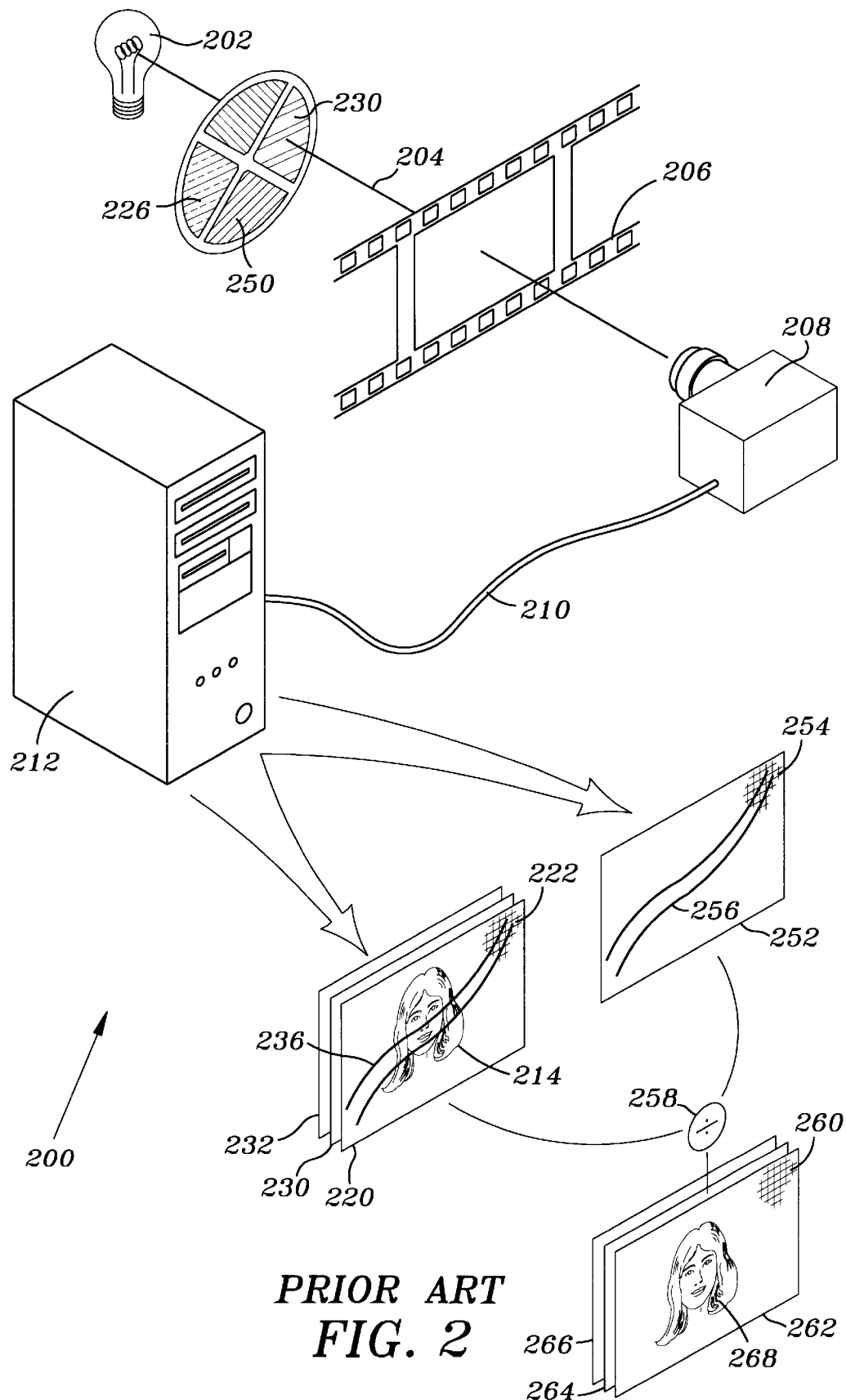
FIG. 2 portrays a prior art transmission scanning apparatus.

Returning to FIG. 1, it is conceivable, although not taught in the prior art, to activate another light source 140 rich in infrared light while extinguishing the original light source 104, and to make another pass of the print 102 so as to generate another channel 142 of the image 130 representing the infrared reflectance of the print. There are other ways of modifying an existing scanner to generate a fourth channel in infrared which are beyond the scope of this patent. The practice of the remainder of this invention requires a conventional reflection scanner to be modified as described so as to produce an infrared scan in addition to the common art visible scan.

Such a reflective scan infrared image is input to the process of FIG. 7 as infrared image 704, along with the matching visible image from the same scanner as visible image 702 as previously described. One further change must be made to the process of FIG. 7 heretofore described to practice infrared reflective surface defect correction. This change is to modify the function of gain block 730 from gain=x defined by line 606 of FIG. 6, to gain=−K+x(1+K) defined by line 1010 of FIG. 10. With this modification, the infrared detail will be subtracted from the highlights, and because of a negative gain of −K when x approaches zero, will add the infrared detail in the shadows.

The estimate of x in function block 724 can be simply x=visible, where visible is the average visible term read from element 720 as described earlier. As a refinement, the estimate of x in function block 724 may follow the formula: x=G+(V−G)(1−G)/(IR−G), where G is the value of x at dust gray, typically 0.25, V is visible element average 720, and IR is infrared element 722, both normalized so 100% reflectance equals unity. This formula is a direct mathematical resolution of the equations, but it can produce infinite gain as infrared approaches dust gray. The singularity that exists as visible and infrared approach the dust gray level is ameliorated by the average over the entire block; however, as a further refinement, the formula can be made less subject to such artifacts by moving the singularity to a pure black infrared number by substituting the formula x=G+(V−G)/IR in function block 724.

Figure 11A:
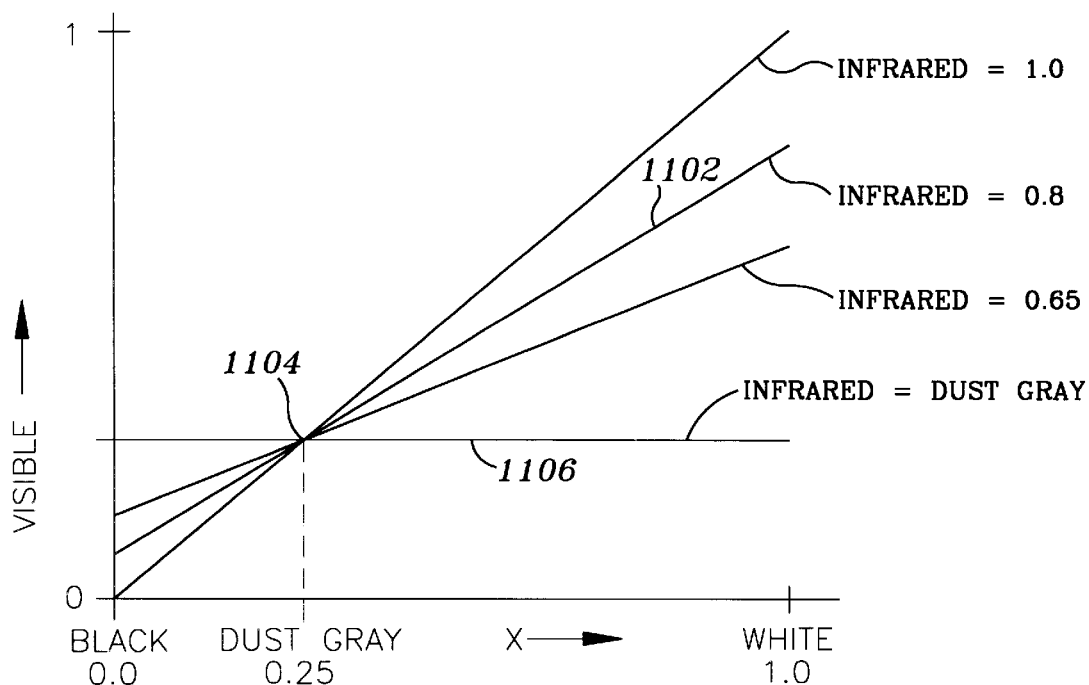
FIGS. 11a and 11b are graphs of the effect of degrees of defect on the visible scan.

The operation of the gain and specific formulas given above are given further intuitive foundation in FIG. 11. FIG. 11a illustrates how the visible record is affected by different degrees of defects. When infrared=unity, there is no defect, and so visible=x. A small defect may attenuate infrared to 0.8, and visible will therefore also be the same 0.8 when x=white. However, the visible line 1102 will pivot on the dust gray point 1104. The extreme refractive defect will pull infrared, and the visible level when x=white, all the way down to dust gray, which will pivot on dust gray 1104 to give the horizontal line 1106. The horizontal line implies no image is seen, whether x=black or x=white, only the dust gray of the defect will be seen.

Figure 11B:
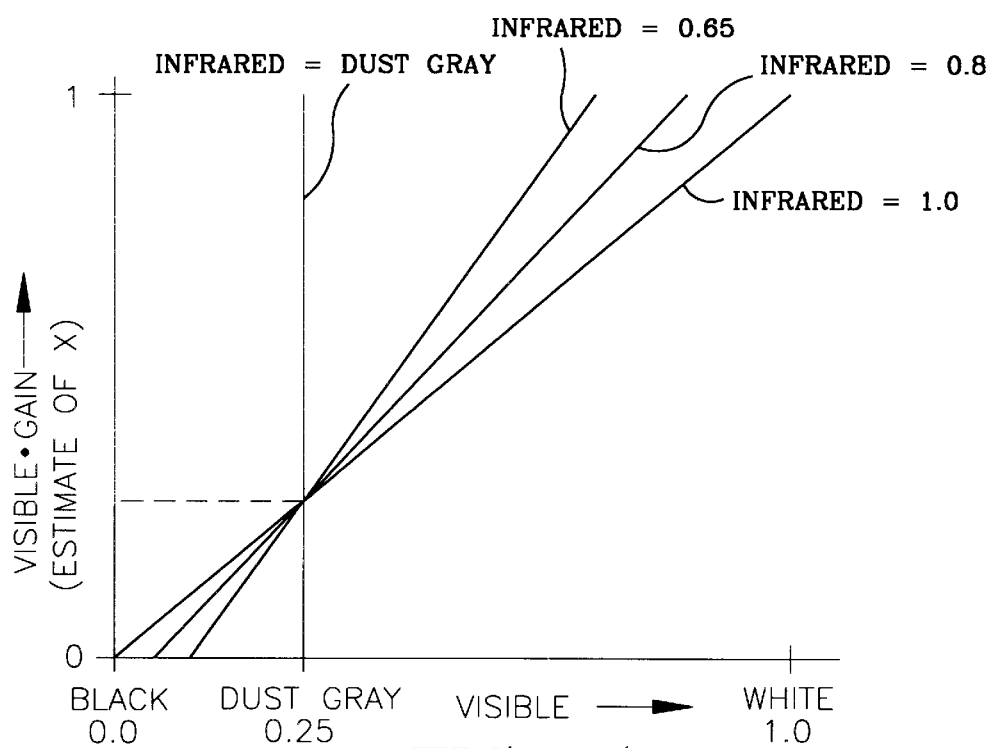

To undo the effects of a defect, the visible record will need to be amplified to overcome the masking effect of the defect. The amplification should be relative to dust gray. FIG. 11b illustrates how a gain is chosen to multiply the visible record such that visible times gain is an estimate of x. Note that when infrared=dust gray, gain goes to infinity in an attempt to see through an opaque defect. Although theoretically correct, this singularity creates gross artifacts in actual systems with deviations from perfection, and is avoided by the offset method taught above.

Figure 4:
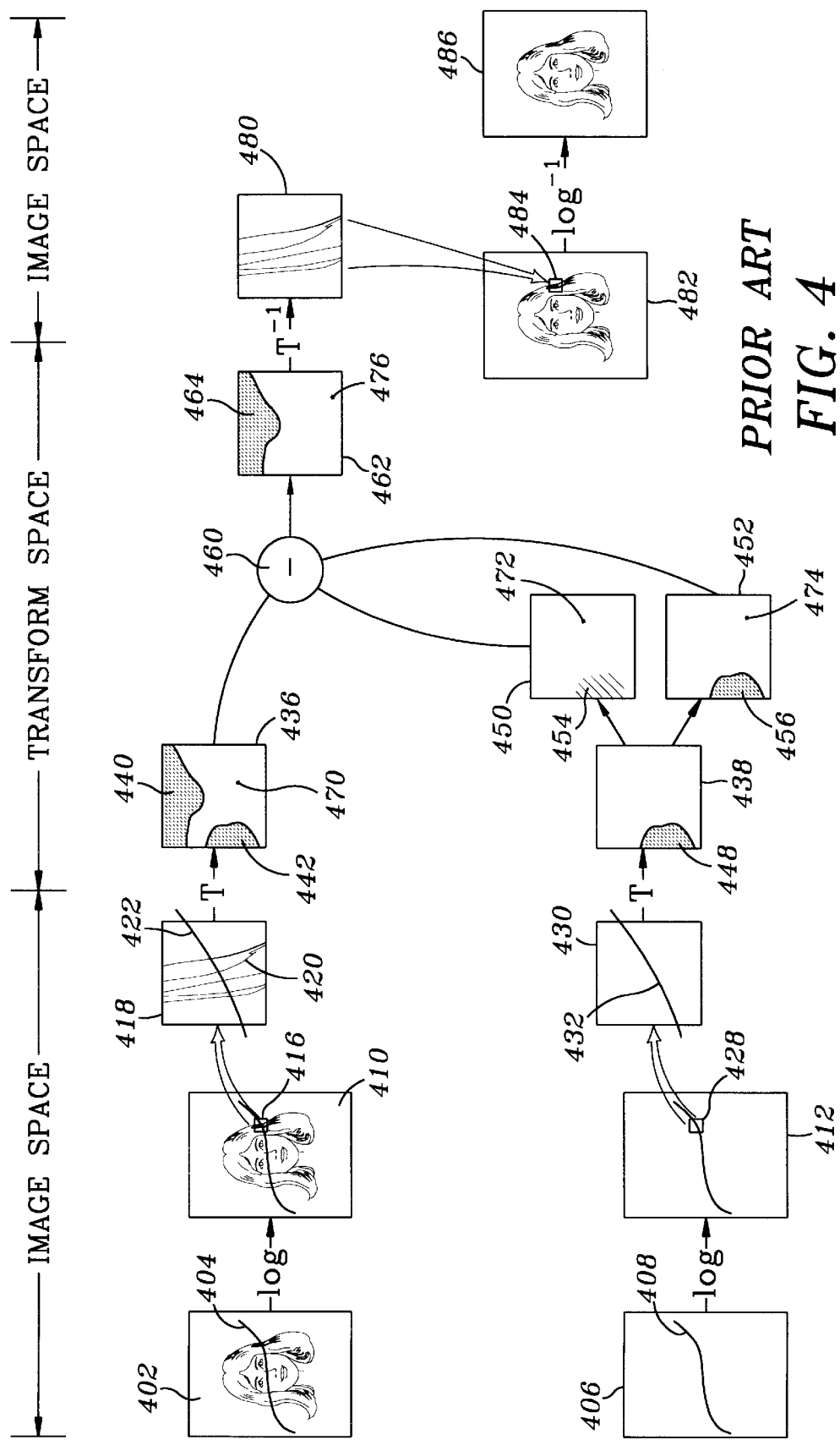
FIG. 4 illustrates a prior art infrared surface defect correction practiced in transform space.

The concept of a correction range was already presented in connection with FIG. 4 in range blocks 450 and 452 acting with the smart subtraction block 460 as defined. This concept of a correction range will now be applied to the method of FIG. 7.

In FIG. 7, let the gain block 730 go to zero, thereby eliminating it from the operation. In its place let the upper bound gain block 770 follow the line 1022 of FIG. 10, such line defining the relationship of input x to output gain, and further let the lower bound gain block 772 follow the line 1020 of FIG. 10. The upper bound gain 770 multiplies each element of the infrared transform block 712 at multiplier 774 to give the upper bound limit transform 776, and similarly the lower bound gain 772 multiplies block 712 at multiplier 778 to give the lower bound block 780. The upper and lower bounds are subtracted from the image transform 710 by the smart subtraction function 744, in effect using whichever bound brings the result closest to zero, and outputting zero when zero is in between the result of both bounds, thereby totally nulling defects that are within the crosshatched uncertainty range 1024 of FIG. 10.

A further refinement makes the nulling range frequency sensitive to accommodate a greater uncertainty range at higher spatial frequencies, as mentioned above. To practice this frequency dependence, the upper and lower gain blocks 770 and 772 are made frequency dependent. In particular, a low frequency element 722 in the infrared transform may be multiplied by upper and lower bound numbers defined by center line 1010 of FIG. 10, whereas a higher frequency element 788 located a distance 790 from the low frequency element 722 would be multiplied by upper and lower bound lines 1022 and 1020 respectively of FIG. 10. Finally, a very high frequency term 792 would be multiplied by upper and lower bound lines 1002 and 1004 respectively. This method enables more aggressive removal of defects at the higher frequencies.

The examples discussed so far have input a single visible image for processing. It should be understood that a full color image could be processed by repeating the described process with a red visible image, a green visible image, and a blue visible image.

The preferred embodiment disclosed with reference to FIG. 7 used a block transform structure; however, the use of such a structure is not a limitation in the practice of the present invention. Other structures permit the multiplication of infrared defect detail by a gain that is determined as a function of visible image brightness in such a way that defects can be corrected from highlights to shadows. As an example, FIG. 12 presents an alternate embodiment of the invention that uses neither blocks nor a frequency transform space.

Figure 12:
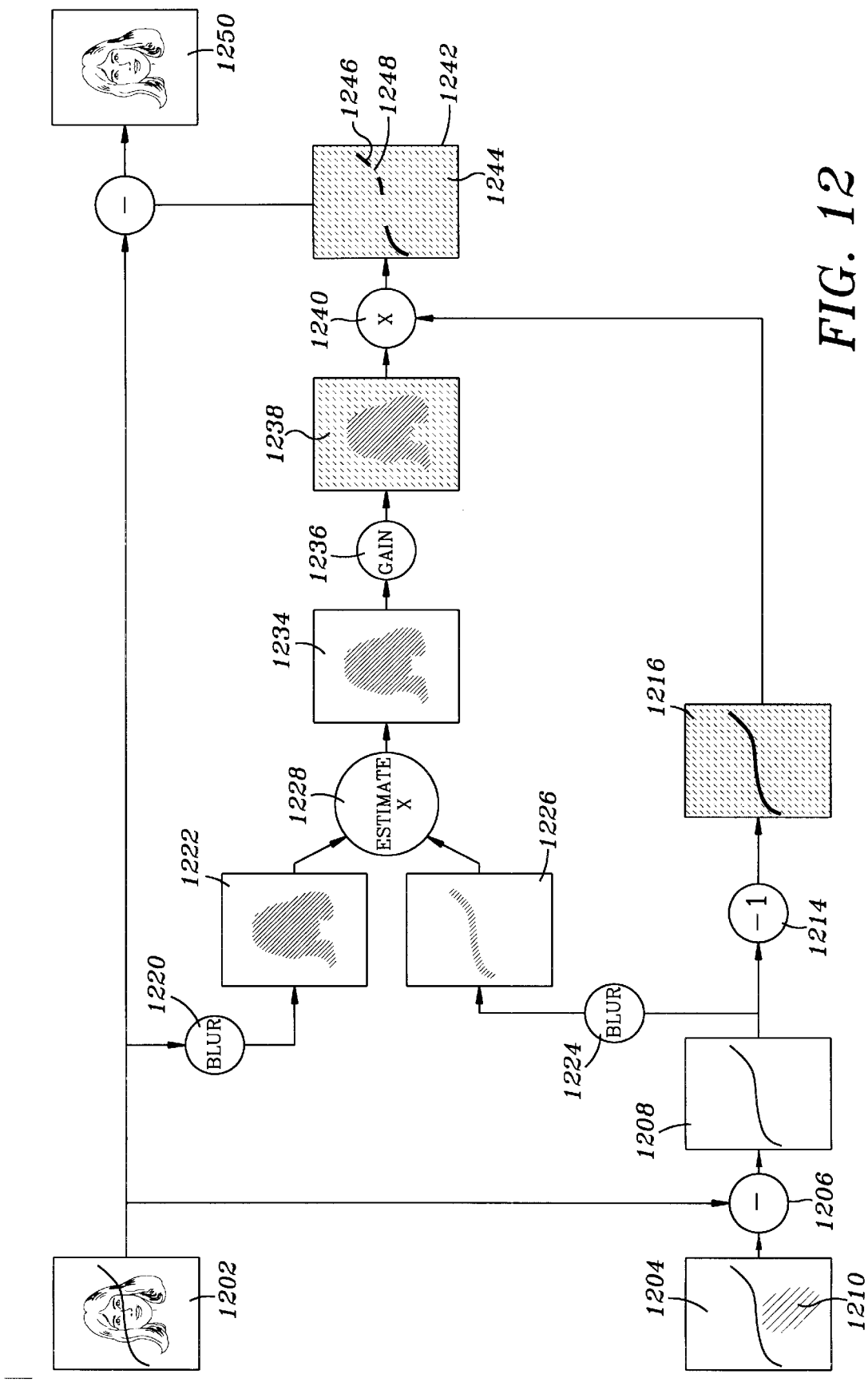
FIG. 12 illustrates an alternate method of practicing the present invention.

In FIG. 12, a visible image 1202 is received along with a registered infrared image 1204. The specific mathematics of this example will assume these images are in linear space, but as explained above, other gamma corrected spaces may be used. At function block 1206 a small amount of the visible image 1202 is subtracted from the infrared image 1204 to yield an infrared image 1208 free of visible traces 1210. In practice, a small amount of the cyan record, as seen in the red visible scan, will appear in the infrared scan 1204 as a smudge 1210. This can be eliminated by moving the wavelength of the infrared scan farther from the visible spectrum, but high wavelength infrared can stress the optics and sensors used in the scanner. In practice, as an expedient, the infrared scan is kept rather close to the visible spectrum under a wavelength around 850 nm, and the residual effect of the visible image is removed by subtracting about 10% of the red visible record. This step could also be applied to any of the examples previously described if needed.

In the example of FIG. 7, the details of the infrared defect scan were separated in frequency as is the nature of a DCT or DFT transform. That is, where there is no defect detail, the film is clear in infrared, and all elements of the infrared transform, except the average term, are zero, and any multiplication of the zero terms by a gain will have no effect on the zero value in that term. Conversely, where there are defects, the transform terms will be nonzero, and will be affected by a multiplication in proportion to the level of the defect. In the present example of FIG. 12, defect details are separated by grayscale. Assuming the image has been normalized such that image 1208 is unity for a section of the image with no defects, function block 1214 subtracts unity from image 1208 to result in an image 1216 that is zero at points with no defect, and as image 1208 drops below unity, image 1216 goes negative in proportion to the depth of the defect. Thus the detail of the defect record has been isolated in image 1216 in such a way that only detail; i.e., nonzero points of the image, will be affected by any multiplication of pixels in the image 1216.

While the defect details are being isolated in image 1216, the gain that will be applied to those defect details is being calculated for each pixel. The visible image is blurred by function block 1220 to form blurred visible image 1222, and the infrared image is blurred by function block 1224 to form blurred infrared image 1226. This blurring reduces artifacts in the calculation of gain caused by irregularities and noise in the image. A typical blur is to average a 9×9 pixel box around each pixel in image 1202 or 1204 to assign the corresponding pixel in blurred image 1222 or 1226.

Next, for each pixel in the blurred visible image 1222, x is estimated in conjunction with the corresponding pixel in the blurred infrared image 1226 by estimator 1228. The method for estimating x based on visible and infrared has been presented above. The estimate of x may be stored in intermediate image 1234. For each x, the gain is calculated in function block 1236 using the function heretofore taught, and the result stored in the corresponding pixel of the gain image 1238. Then, the defect details in image 1216 are multiplied pixel by corresponding pixel with the gain image 1238 at multiplier 1240 to produce corresponding pixels of the corrector image 1242. The corrector image 1242 contains zeroes at points 1244 with no defect present, has negative values at points 1246 were a defect is present and the visible image is light, and has positive values at points 1248 were a defect is present and the visible image is nearly black, below dust gray. Finally, the corrector image 1242 is subtracted from the input image 1202 to generate the corrected image 1250 substantially free of defects.

Whereas the present invention has been described with respect to specific embodiments thereof, it will be understood that various changes and modifications will be suggested to one skilled in the art and it is intended to encompass such changes and modifications as fall within the scope of appended claims.

I claim:

1. A method for removing the effect of surface defects from a scan of an image behind a surface, comprising:

receiving visible light from the image to form a visible light image, receiving infrared light from the image to form an infrared light image, distinguishing the effect of a surface defect on the infrared light image, multiplying the effect by a first function of the magnitude of visible light to produce a product, and removing the product from the visible light image.

2. The method of claim 1 wherein the visible light from the image is light reflected from the image.

3. The method of claim 2 wherein the magnitude of visible light is the magnitude of visible light within a region of the image.

4. The method of claim 3 wherein the first function of the magnitude of visible light increases with increasing magnitude of visible light.

5. The method of claim 3 wherein the first function of the magnitude of visible light is negative for a small magnitude of visible light.

6. The method of claim 3 wherein the first function of the magnitude of visible light is unity for a magnitude of visible light representing a white image.

7. The method of claim 1 wherein distinguishing the effect of a surface defect on the infrared light image further comprise: subtracting from the infrared light image a magnitude corresponding to the magnitude of the infrared light image in a region with no surface defect.

8. The method of claim 1 wherein distinguishing the effect of a surface defect on the infrared light image further comprises: isolating the effect of a surface defect in the spatial frequency domain.

9. The method of claim 8 wherein isolating the effect of a surface defect further comprises operating on a portion of the infrared light image with a discrete cosine transform.

10. The method of claim 8 wherein isolating the effect of a surface defect further comprises the step of isolating the angle of a surface defect.

11. The method of claim 10 wherein isolating the effect of a surface defect further comprises operating on a portion of the infrared light image with a discrete Fourier transform.

12. The method of claim 1 wherein the first function of the magnitude of visible light is of the form $-K+\text{visible}(1+K)$, where K is a constant greater than zero and less than one.

13. The method of claim 1 wherein the first function of the magnitude of visible light is also a function of the magnitude of infrared light.

14. The method of claim 13 wherein the first function of the magnitudes of visible and infrared light is of the form $-K+x(1+K)$, where K is a constant greater than zero and less than one, and x is a function of the magnitudes of visible and infrared light of the form $G+(\text{visible}-G)(1-SG)/(\text{infrared}-SG)$ where G is dust gray, and S is a constant that is unity or less.

15. A method for removing the effects of surface defects from a scan of an image behind a surface, comprising:

receiving visible light from the image to form a visible light image, receiving infrared light from the image to form an infrared light image, distinguishing the effect of a surface defect on the infrared light image, multiplying the effect by an upper bound function of the magnitude of visible light to produce an upper bound product, multiplying the effect by a lower bound function of the magnitude of visible light that is less than the upper bound function to produce a lower bound product, and removing a mix of the upper bound product and lower bound product from the visible light image.

16. The method of claim 15 wherein the lower bound function of the magnitude of visible light increases with increasing magnitude of visible light.

17. The method of claim 16 wherein the lower bound function of the magnitude of visible light is negative for a small magnitude of visible light.

18. The method of claim 16 wherein the difference between the upper and lower bound functions of visible light increases for smaller magnitudes of visible light.

19. The method of claim 16 wherein removing a mix further comprises selecting a mix that will maximize removal of the effect of the defect from the visible light image.

20. The method of claim 16 wherein removing a mix further comprises removing either the upper bound product or the lower bound product so as to maximize removal of the effect of the defect from the visible light image.

* * * * *